UNITED STATES PATENT OFFICE.

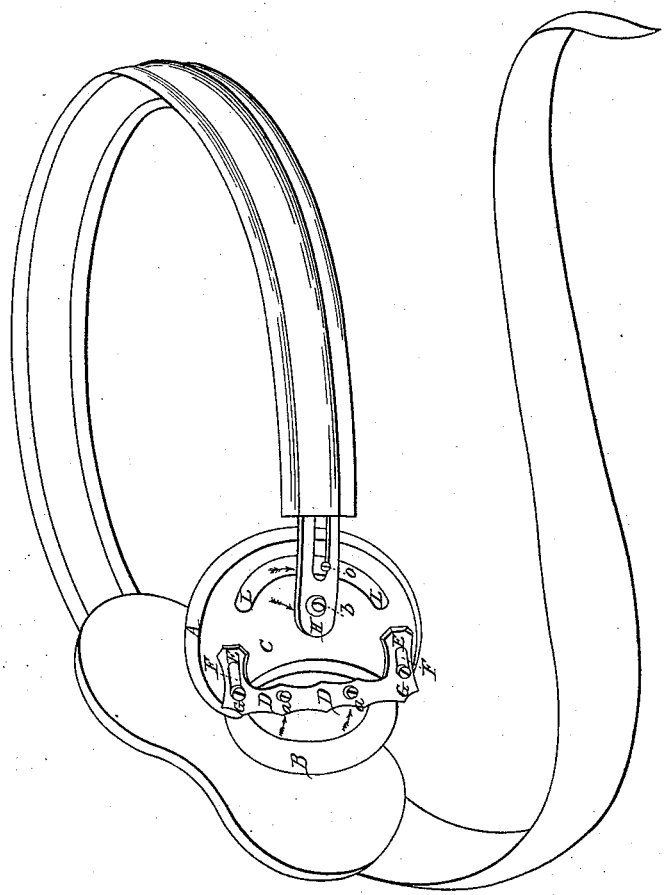

D. L. D. SHELDON, OF SAN FRANCISCO, CALIFORNIA.

HERNIAL SPRING-TRUSS.

Specification of Letters Patent No. 29,410, dated July 31, 1860.

*To all whom it may concern:*

Be it known that I, D. L. D. SHELDON, of the city and county of San Francisco and State of California, have invented an Improved Mode of Constructing Abdominal Trusses for the Treatment and Cure of Hernia; and I do hereby declare that the following is a full and exact description.

To enable others skilled in the art, to manufacture and use my invention, I will proceed to describe its construction, and operation: The part of the pad commonly called the cushion, A (as shown in the accompanying drawing) is made soft, in the form of a cushion; or it is made of wood, or ivory; (the latter I consider superior) and is attached to a plate C (as shown in the accompanying drawing,) above it; as will hereafter be described; these two pieces will be denominated the pad, which is formed similar in shape to a three-quarter circle, with the interrupting edge; (or that toward the outside of the body when applied) sufficiently concave, to admit a portion of an oval compress or ball of some hard substance within its concavity. The compress or ball B, (as shown in the accompanying drawing,) is connected to the pad by a narrow metallic plate D D (as shown in the accompanying drawing) passing from one horn of the pad to the other; with an arm E (as shown in the aforesaid drawing,) extending from each end, toward the body of the pad; or toward the portion of the pad to which the spring is attached. A longitudinal aperture F (as shown in said drawings) is formed in each arm, through which a screw G (as shown in said drawing) enters each horn of the pad, fastening the two portions of the pad together, thus allowing the plate to slide on said horns, any portion, or the whole length of the apertures in said arms; therefore the compress can be extended, or retracted, either or both ends at the same time, any distance required and made fast, by tightening the screws which pass through said aperture. The compress or ball is attached to said plate by two screws $a\ a$ (as shown in the accompanying drawing) passing through the plate, and entering two nuts ← (as shown in the drawing) in the compress or ball; equal distance from both ends of the plate, and compress. Directly under, and sunk within a portion of the plate, a washer is fastened, which encircles a neck just below the head of each screw, for the purpose of keeping the screws from moving in the plate, otherwise than turning around either way, as may be necessary. The nuts in the compress or ball receiving the screws, are hung on a swivel for the purpose of allowing either end of the compress or ball to be elevated, or depressed; separately or together, as may be required.

Just back of the concave edge, and near the center of the pad, one end of a flat spring H (as shown in the accompanying drawing) is attached, (which partially encircles the body,) by having a hole near its end; this hole encircles a pivot nut ← (as shown in the aforesaid drawing) which is made fast to the plate of the pad. A screw, $b$ (as shown in the accompanying drawing) which passes through the nut, and into the ivory part of the pad, keeps the spring from slipping from said pivot nut; by its head pressing upon the spring; thus a circuitous motion is allowed to the pad; it is therefore easily fitted to any inguinal line. To check this circuitous motion to the extent required in any given case; another hole is made in the spring, nearly as far back as the convex edge of the pad; a semicircular slit L L (as shown in the drawing) is made in the plate of the pad, to correspond exactly with the hole in the spring, when the pad is circuitously moved; in this semicircular slit, a sliding nut ← (as shown in the drawing) is fixed; so that it cannot turn around; it extends above the plate, so as to pass nearly through the hole in the spring. A screw $o$, (as shown in the drawing) enters this; the head of which comes directly on the spring, pressing it against the plate of the pad, sufficiently to hold it just where it may be required.

What I claim as my invention, and desire to secure by Letters Patent as a new article of manufacture is—

An abdominal truss combining in its construction a pad with a cushion A, and plate C, a compress or ball B, sliding plate D, and spring H, and applied in the manner and for the purpose herein set forth and described.

Dated at San Francisco Dec. 19th 1859.

D. L. D. SHELDON.

Witnesses:
S. MORRIS LOCKE,
W. W. MONTAGUE.